(12) United States Patent
Kunze et al.

(10) Patent No.: US 8,879,149 B2
(45) Date of Patent: Nov. 4, 2014

(54) ARRANGEMENT FOR MOUNTING CARRIERS FOR PROJECTION SCREENS OF HEAD-UP-DISPLAYS

(75) Inventors: Norbert Kunze, Diez (DE); Horst Rumpf, Herborn (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 13/823,066

(22) PCT Filed: Sep. 16, 2011

(86) PCT No.: PCT/EP2011/066063
§ 371 (c)(1),
(2), (4) Date: May 10, 2013

(87) PCT Pub. No.: WO2012/035127
PCT Pub. Date: Mar. 22, 2012

(65) Prior Publication Data
US 2013/0222903 A1 Aug. 29, 2013

(30) Foreign Application Priority Data

Sep. 17, 2010 (DE) .......................... 10 2010 045 861

(51) Int. Cl.
G03B 21/56 (2006.01)
A47G 29/00 (2006.01)
G03B 21/54 (2006.01)
G02B 27/01 (2006.01)
B60K 35/00 (2006.01)
B60R 11/02 (2006.01)
B60R 11/00 (2006.01)

(52) U.S. Cl.
CPC ............ *G02B 27/0149* (2013.01); *G03B 21/54* (2013.01); *G02B 2027/0154* (2013.01); *B60K 35/00* (2013.01); *B60R 2300/205* (2013.01); *B60K 2350/2052* (2013.01); *G02B 27/01* (2013.01); *B60R 2011/0057* (2013.01); *B60R 2011/0026* (2013.01); *B60R 2011/0078* (2013.01); *B60R 11/0229* (2013.01); *B60K 2350/405* (2013.01)
USPC .......................................... 359/443; 248/683

(58) Field of Classification Search
CPC .............................................. G02B 2027/0181
USPC .................... 359/443; 345/7; 40/661.01, 643; 446/92; 24/303; 248/683, 467
See application file for complete search history.

(56) References Cited

U.S. PATENT DOCUMENTS 5,543,832 A * 8/1996 Oravecz et al. ................. 348/65
6,909,408 B2 * 6/2005 Matko et al. ..................... 345/7

(Continued)

FOREIGN PATENT DOCUMENTS

DE 102009 43 038 A1 4/2010
JP 2004-4126450 A1 4/1992

(Continued)

OTHER PUBLICATIONS

International Search Report received in connection with international applicatin No. PCT/EP2011/066063; dtd Mar. 13, 2012.

(Continued)

*Primary Examiner* — Christopher Mahoney
(74) *Attorney, Agent, or Firm* — Foley & Lardner LLP

(57) ABSTRACT

An arrangement for mounting a projection screen for a head-up-display, which can be attached in a removable fashion to a windscreen of a vehicle in the driver's field of vision, contains a mount for the projection screen, which mount forms a detachable connection with a base frame. The mount has a carrier on which the projection screen is mounted and which can be connected to the base frame by at least two magnetic coupling points.

16 Claims, 1 Drawing Sheet

(56) References Cited

U.S. PATENT DOCUMENTS

| | | | |
|---|---|---|---|
| 2010/0097567 A1* | 4/2010 | Rousseau | 351/158 |
| 2012/0169999 A1* | 7/2012 | Cavendish et al. | 353/10 |

FOREIGN PATENT DOCUMENTS

| | | |
|---|---|---|
| JP | 3019017 Y | 12/1995 |
| JP | 10-268227 A | 10/1998 |
| JP | 2001-277902 A | 10/2001 |
| KR | 10-2006-0117594 | 11/2006 |
| KR | 10-2007-0040111 | 4/2007 |
| WO | WO-92/19992 | 11/1992 |
| WO | WO-92/19992 A2 | 11/1992 |

OTHER PUBLICATIONS

Office Action dated Apr. 15, 2014 received in corresponding Japanese Patent Application No. 2013-528678 along with English translation.
Office Action dated Apr. 24, 2014 received in corresponding Korean Patent Application No. 10-2013-7009653 along with English translation.
Office Action dated Jul. 30, 2014 in corresponding Chinese Application No. 201180044769.8, and English translation, 11 pages.

* cited by examiner

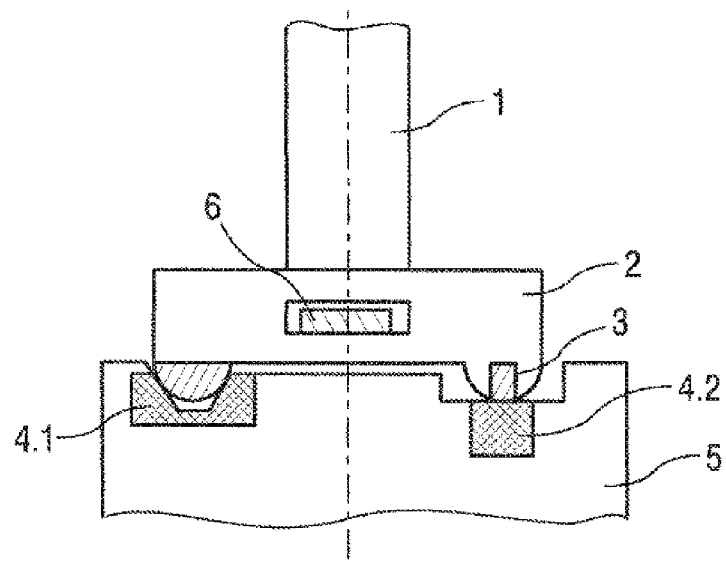

ARRANGEMENT FOR MOUNTING CARRIERS FOR PROJECTION SCREENS OF HEAD-UP-DISPLAYS

CROSS REFERENCE TO RELATED APPLICATIONS

The present application is a National Stage of International Application No. PCT/EP2011/066063 filed on Sep. 16, 2011, which claims the benefit of German Patent Application No. 10 2010 045 861.9 filed on Sep. 17, 2010, the entire disclosures of which are incorporated herein by reference.

The invention relates to an arrangement for mounting a projection screen for a head-up display, which can be fitted in a removable manner on a windshield of a vehicle in the driver's field of vision.

Vehicle-related information is projected onto the projection screen by a TFT display. Projection screens are subjected to high levels of mechanical and thermal stressing, caused by high temperatures, sunlight and scratch marks. It is therefore usually necessary for these components to be exchanged a number of times during the service life of a vehicle.

In the case of the arrangements which are known from the prior art, it is necessary, if the projection surface is damaged, for the entire arrangement to be exchanged.

JP 2004 41 26 450 A1 describes an arrangement in which a projection screen can be pivoted from the windshield into a protected position with the aid of an articulated lever arrangement. Although it is thus possible for the service life of the projection surface to be increased, it is nevertheless necessary, when the projection surface is exchanged, for the entire arrangement to be removed.

It is an object of the present invention to provide an arrangement which makes it possible for a projection screen which has to be replaced or repaired to be exchanged straightforwardly.

The object is achieved according to the invention by an arrangement which contains a holder for the projection screen, the holder forming a releasable connection to a basic framework, wherein the holder has a carrier, on which the projection screen is mounted and which can be connected to the basic framework by way of at least two magnetic coupling locations.

The releasable connection contains a stable carrier, on which the projection screen is mounted and which ensures that the optical surface of the projection screen is not deformed during exchange.

In order to ensure defined abutment, coupling locations with punctiform or linear contact are provided. For exclusively punctiform contacts, three coupling locations are necessary. For linear contact, at least two coupling locations are necessary.

An advantageous embodiment provides that a first magnetic coupling location is formed by a prism/sphere pairing and a second magnetic coupling location is spaced apart therefrom.

It is also possible for a first magnetic coupling location to be formed by a prism/cylinder pairing and for a second magnetic coupling location to be spaced apart therefrom.

This configuration makes it possible to ensure precisely defined abutment, wherein installation and removal can take place straightforwardly and without any auxiliary means being required.

The spaced-apart second magnetic coupling location may be formed by a plane/sphere pairing or a plane/cylinder pairing. It is thus possible to ensure a high level of positioning accuracy and effective securing action against rotation.

Permanent magnets are advantageously used for the magnetic coupling locations.

It is preferable for the magnets to be fitted on the basic framework and for counterparts, which correspond to the magnets and are made up of a ferromagnetic material, to be arranged on the carrier.

It is also possible for the magnets to be fitted on the carrier and for counterparts, which correspond to the magnets and are made up of a ferromagnetic material, to be arranged on the basic framework.

A snap-in connection makes it possible for the connection between the carrier and the basic framework to be additionally secured. Upon insertion of the carrier into the basic framework, it is thus also possible to signal that the desired position has been reached.

In the case of a preferred embodiment of the snap-in connection, a securing tongue, which is mounted on the basic framework, engages in an aperture, which is provided on the carrier.

The invention will be explained in more detail with reference to the accompanying schematic FIGURE.

FIG. 1 shows a schematic illustration of a possible embodiment of the arrangement.

The projection screen (not illustrated here) is mounted on a carrier 1. The carrier 1 contains, on its side which is directed toward a basic framework 5, an extension-arm part 2, on which cylindrical or spherical-segment-like counterparts 3 made of a ferromagnetic material are fitted. The counterparts 3 engage in depressions, which are provided on that side of the basic framework 5 which is directed toward the carrier 1, and in which magnets 4 are located. The magnet 4.1, which is illustrated on the left-hand side of the FIGURE, has a depression; the magnet 4.2, which is illustrated on the right-hand side, has a planar surface. These surfaces form the contact surface in relation to the ferromagnetic counterparts 3. This creates a releasable connection, which ensures precise positioning of the carrier 1 on the basic framework 5.

It is possible for the pairing locations to be configured in various ways. The counterparts 3 may be designed as parts in the form of half-cylinders or hemispheres. The magnets 4.1 may have prismatic or spherical depressions.

The position in the installed state is secured by a securing tongue 6, which is fastened in addition on the basic framework 5 and, when the desired position is reached, latches into an aperture provided on the carrier 1.

LIST OF DESIGNATIONS

1 Carrier
2 Extension-arm part of the carrier
3 Counterpart made of ferromagnetic material
4 Magnets
4.1 Magnet with depression
4.2 Magnet with planar contact surface
5 Basic framework
6 Securing tongue

The invention claimed is:
1. An arrangement for mounting a projection screen for a head-up display, which can be fitted in a removable manner on a windshield of a vehicle in the driver's field of vision, comprising:
   a holder for the projection screen, the holder forming a releasable connection to a basic framework,
   wherein the holder has a carrier, on which the projection screen is mounted and which can be connected to the basic framework by way of at least two magnetic coupling locations, and wherein a first magnetic coupling location is formed by a prism/sphere pairing and a second magnetic coupling location is spaced apart therefrom.

2. The arrangement as claimed in claim 1 wherein the spaced-apart second magnetic coupling location is formed by a plane/sphere pairing.

3. The arrangement as claimed in claim 1 wherein the spaced-apart second magnetic coupling location is formed by a plane/cylinder pairing.

4. The arrangement as claimed in claim 1 wherein the magnetic coupling locations contain magnets which are designed as permanent magnets.

5. The arrangement as claimed in claim 4, wherein the magnets are fitted on the basic framework, and counterparts, which correspond to the magnets and are made of a ferromagnetic material, are arranged on the carrier.

6. The arrangement as claimed in claim 4 wherein the magnets are fitted on the carrier, and counterparts, which correspond to the magnets and are made of a ferromagnetic material, are arranged on the basic framework.

7. The arrangement as claimed in claim 1 wherein the connection between the carrier and the basic framework is secured by a snap-in connection.

8. The arrangement as claimed in claim 7, wherein the snap-in connection is formed from a securing tongue, which is mounted on the basic framework, and an aperture, which is provided on the carrier.

9. An arrangement for mounting a projection screen for a head-up display, which can be fitted in a removable manner on a windshield of a vehicle in the driver's field of vision, comprising:
 a holder for the projection screen, the holder forming a releasable connection to a basic framework,
 wherein the holder has a carrier, on which the projection screen is mounted and which can be connected to the basic framework by way of at least two magnetic coupling locations, and
 wherein a first magnetic coupling location is formed by a prism/cylinder pairing and a second magnetic coupling location is spaced apart therefrom.

10. The arrangement as claimed in claim 9, wherein the spaced-apart second magnetic coupling location is formed by a plane/sphere pairing.

11. The arrangement as claimed in claim 9, wherein the spaced-apart second magnetic coupling location is formed by a plane/cylinder pairing.

12. The arrangement as claimed in claim 9 wherein the magnetic coupling locations contain magnets which are designed as permanent magnets.

13. The arrangement as claimed in claim 12, wherein the magnets are fitted on the basic framework, and counterparts, which correspond to the magnets and are made of a ferromagnetic material, are arranged on the carrier.

14. The arrangement as claimed in claim 12 wherein the magnets are fitted on the carrier, and counterparts, which correspond to the magnets and are made of a ferromagnetic material, are arranged on the basic framework.

15. The arrangement as claimed in claim 9 wherein the connection between the carrier and the basic framework is secured by a snap-in connection.

16. The arrangement as claimed in claim 15, wherein the snap-in connection is formed from a securing tongue, which is mounted on the basic framework, and an aperture, which is provided on the carrier.

\* \* \* \* \*